United States Patent [19]

Bernhard

[11] Patent Number: 4,909,377

[45] Date of Patent: Mar. 20, 1990

[54] PRELIMINARY STAGE OF CONTAINER PROCESSING MACHINES

[75] Inventor: Herbert Bernhard, Wolfsheim, Fed. Rep. of Germany

[73] Assignee: Seitz Enzinger Noll Machinenbau Aktiengesellschaft, Mannheim, Fed. Rep. of Germany

[21] Appl. No.: 87,417

[22] Filed: Aug. 20, 1987

[30] Foreign Application Priority Data

Aug. 20, 1986 [DE] Fed. Rep. of Germany ....... 3628298
May 22, 1987 [DE] Fed. Rep. of Germany ....... 3717338

[51] Int. Cl.[4] .............................................. B65G 47/84
[52] U.S. Cl. ................................ 198/480.1; 198/481.1
[58] Field of Search ............................ 198/480.1, 481.1

[56] References Cited

U.S. PATENT DOCUMENTS

| | | | |
|---|---|---|---|
| 2,713,960 | 7/1955 | Siegal | 198/481.1 X |
| 2,795,090 | 6/1957 | Sterna | 198/481.1 X |
| 3,363,741 | 1/1968 | Dierksheide | 198/480.1 |
| 4,230,219 | 10/1980 | Pezzin et al. | 198/480.1 X |

FOREIGN PATENT DOCUMENTS 3432590 3/1986 Fed. Rep. of Germany .

*Primary Examiner*—Robert J. Spar
*Assistant Examiner*—Lyle Kimms
*Attorney, Agent, or Firm*—Robert W. Becker & Associates

[57] ABSTRACT

A preliminary stage of a container processing machine, including a container inlet for containers that are to be processed, a container outlet for processed containers, and transport elements for effecting the flow of containers between the inlet and outlet, with at least one of these transport elements including a transport star, which rotates about a vertical shaft, and a restraining element, with the transport star having a peripheral surface that concentrically encircles the axis of rotation of the latter and that is provided with a plurality of uniformly spaced recesses that are radially open in the direction of said peripheral surface and serve to transport the containers along a circular path from an inlet of the transport star to an outlet thereof. The restraining element is disposed to the side of the circular transport path opposite the peripheral surface, and is formed from at least one free length of at least one belt-like element that is disposed externally of the star, forms a closed loop, and is endlessly guided, in a tension state, over rollers that are provided on the machine frame. Each free length is disposed radially remote from the axis of rotation of the peripheral surface of the transport star, and each peripheral surface is embodied in such a way that the free length rests thereagainst at least when the transport star is not filled with containers.

19 Claims, 6 Drawing Sheets

PRELIMINARY STAGE OF CONTAINER PROCESSING MACHINES

BACKGROUND OF THE INVENTION

The present invention relates to a preliminary stage of a container processing machine, particularly of a bottle filling machine, and especially on a bottle filling machine that has one or more processing stations. Provided are a container inlet for containers that are to be processed, a container outlet for processed containers, and transport elements for effecting the flow of containers between the inlet and outlet, with at least one of the transport elements comprising a transport star, which rotates about a vertical shaft, and a restraining element. The transport star has a peripheral surface that concentrically encircles the axis of rotation of the latter and that is provided with a plurality of uniformly spaced recesses that are radially open in the direction of said peripheral surface and serve to transport the containers along a circular path from an inlet of the transport star to an outlet thereof. The restraining element is disposed to the side of the circular transport path opposite the peripheral surface of the transport star.

It is known, in general, to provide container processing machines, such as filling machines, closure machines, and labelling machines, with a so-called preliminary stage, i.e. a machine region that is provided with transport elements, via which the bottles or containers that are to be handled or processed are fed to the processing station of the machine, which processing station is provided with the processing elements, or via which, after the processing, the bottles are removed from the station and are withdrawn from the machine. Thus, the preliminary stage forms the actual container inlet and container outlet of the overall machine, which comprises the preliminary stage and processing station, with at least two transport elements being provided at the preliminary stage for the flow of containers. One of these transport elements feeds to the processing station of the machine those bottles that at the inlet side are supplied at a prescribed distance and distribution via a conveyor belt and inlet screw mechanism. Another of the transport elements withdraws the processed containers out of the processing station and hence out of the machine. Especially with container or bottle filling machines that have a number of processing stations, such as a filling station and a closure station, it is customary to also associate with the preliminary stage the closure station for filled containers or bottles. The preliminary stage is then provided with at least three transport elements, and in particular again one transport element for supplying the containers that are to be filled to the container or bottle filling station, another transport element in the form of a transfer element for withdrawing the filled containers or bottles from the filling station and transferring them to the closure station, as well as a further transport element for withdrawing the closed containers or bottles from the closure station and for passing them on, for example to a subsequent conveyor belt that withdraws the containers or bottles.

In order to deliver the containers at the required spacing or distribution, and in order to assure a frictionless receiving and transfer of the containers, each of the aforementioned transport elements is embodied as a transport star, the periphery of each of which is provided with a plurality of recesses (pockets) that are open toward the periphery, are distributed at the same angular spacing, and serve to receive containers. Each of the containers received by the recesses of the transport stars is moved by the latter along a partial circular conveying path. In order to retain or restrain the containers in the recesses of the transport stars, a restraining element is furthermore provided along the partially circular conveying stretch of each star. This restraining element encircles the partially circular conveying stretch of the pertaining transport star between the inlet and the outlet of that star. In this connection, the inlet of the transport star marks the beginning of the partially circular conveying stretch, and the outlet of the transport star marks the end of such conveying stretch. With the heretofore known preliminary stages, these restraining elements are externally disposed guide regions or guide curves, each of which forms a fixed guide surface for the containers and encircles the partially circular conveying stretch of the pertaining transport star. In order to assure that the containers are reliably retained in the recesses of the conveying stars, the distance between the guide surface and the axis of rotation of the respective transport star must be adapted to the diameter of the containers that are disposed in an upright manner in the recesses of the transport stars.

Since, for example in beverage-processing plants, containers or bottles of various sizes or diameters must often be processed with the container canning machines that are present there, it is necessary with the heretofore known preliminary stages, prior to changing from one container or bottle size to another container size or type, to adjust the guide regions or guide curves to the new container size, or to exchange the existing guide regions for new regions that are adapted to the new container size. This requires extensive and time-consuming changeovers. A further drawback of the heretofore known preliminary stages is that as a result of the sliding guidance of the containers along the guide surfaces of the guide areas, and on the sliding surfaces on which the bottoms of the containers slide, it is not possible to have a vibration-free transport of the containers, nor a transport of the containers without a certain inherent movement, such as a rotational movement about the vertical axis of the container. The latter is a drawback especially in the region of those transport stars (transfer stars) that serve as transfer elements, because a nonvibration-free transport of those containers that are filled and are being transferred with these transport stars from the filling station to the closure station can lead to a loss of the contents from the containers, for example if the latter foam over. Since furthermore with the heretofore known preliminary stages the containers are held in the recesses of the transport stars with "play", a relatively high noise level also results during transport of the containers with the transport stars.

In order to achieve a certain amount of simplification of the changeover of preliminary stages for various container sizes, it was proposed in German Offenlegungsschrift 34 32 590 Sindermann et al dated Mar. 13, 1986, to use different guide regions for different container sizes, with common centering devices being provided in the preliminary stage to hold these guide regions, and with the latter being centrally arrested via rapid tensioning mechanisms that are operated electrically, hydraulically, mechanically, etc. However, despite a relatively expensive and complicated construction, it is not possible with these heretofore known preliminary stages to eliminate the need for changeover when processing different sizes of containers.

It is an object of the present invention to improve a preliminary stage of the aforementioned general type in such a way that it is possible to process containers of various sizes or diameters without the need to undertake changeover measures with regard to the guide regions, and that in addition the containers can be held in a play-free manner in at least that transport star that serves as a transport element.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

Figure 1:
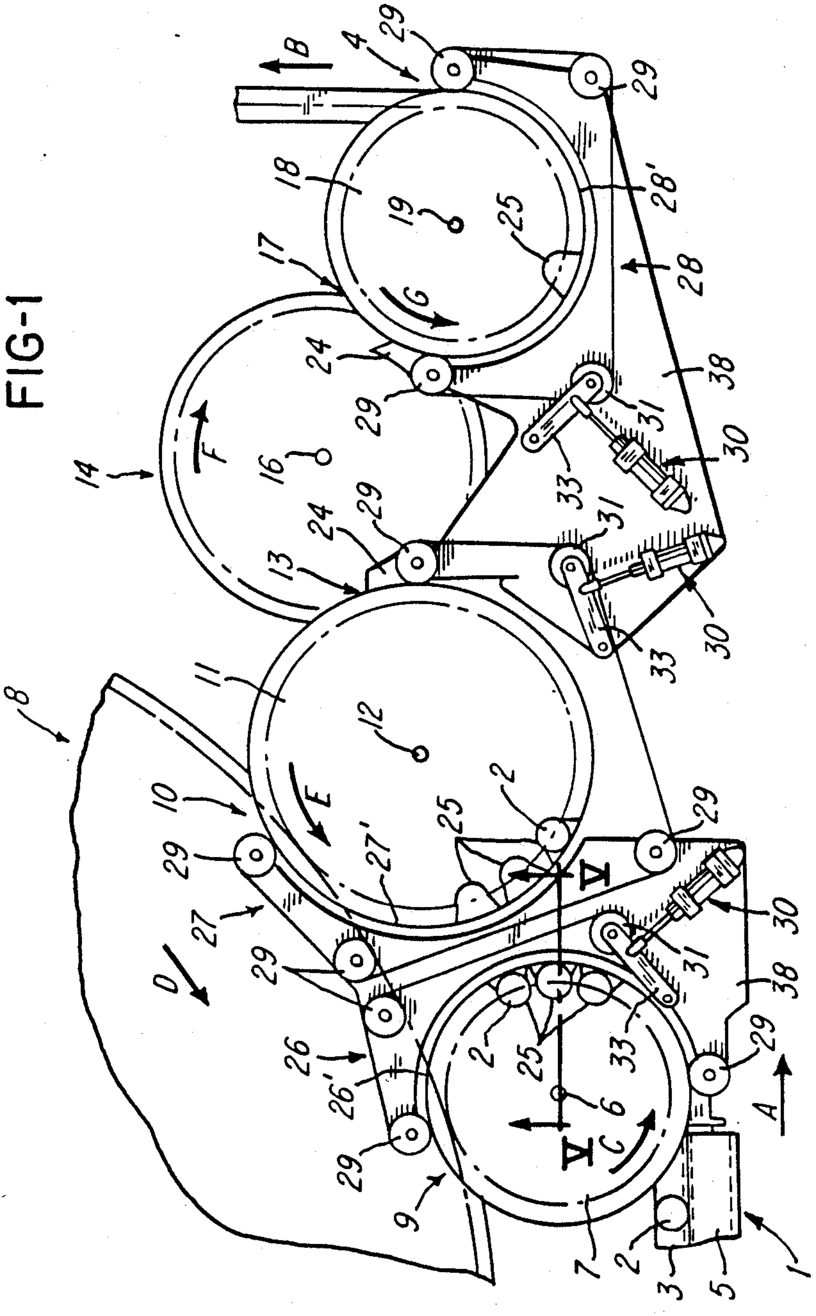
FIG. 1 is a plan view of one exemplary embodiment of the inventive preliminary stage of a container or bottle processing machine.

The preliminary stage of the present invention is characterized primarily in that the restraining element is formed from at least one free length of at least one belt-like element that is disposed externally of the transport star, that forms a closed loop, and that is endlessly guided, in a tensioned state, over rollers that are provided on the machine frame, with each free length being disposed radially remote from the axis of rotation of the peripheral surface of the transport star, and with each peripheral surface being embodied in such a way that the free length rests thereagainst at least when the transport star is not filled with containers.

With the inventive preliminary stage, it is not an external guide region or guide curve that serves as the restraining element for the containers in the recesses of the transport star, but rather the free length of the endless and tensioned belt-like element that forms a loop and encircles the transport star in the region of the transporting stretch thereof. The containers received by the transport star are pressed into the recesses thereof by this belt-like element, which rotates synchronously with the transport star. The containers are securely held in these recesses, i.e. the belt-like element operates as a tensioning belt with which the containers are restrained in the recesses of the transport star, with the tensioning force that is required to accomplish this being achieved via the tensioning mechanism, preferably in cooperation with a certain inherent elasticity of the belt-like element. Since that length of the belt-like element that serves as the restraining element faces a circular cylindrical peripheral surface of this transport star radial to the axis of rotation of the latter, with this link being under the influence of the tensioning mechanism, when containers are missing, i.e. when there are gaps in the flow of the containers, the belt-like element can rest against the peripheral surface of the transport star, so that in this situation also no disruptions of the function of the machine occur.

Pursuant to one possible specific embodiment of the present invention, this circular cylindrical peripheral surface of the transport star is embodied in such a way that the radius that determines this peripheral surface is less than the radius that determines the circular path of the conveying stretch of the transport star. The peripheral surface is formed on a portion of the transport star between the upper and lower side thereof, with this portion of the transport star having a diameter that is less than or at most equal to twice the distance of that closed side of at least one recess that faces the axis of rotation of the transport star from this axis of rotation. This embodiment has the advantage that the annular or circular cylindrical peripheral surface is not interrupted by the recesses of the transport star, and furthermore is disposed between two portions of the transport star that have a greater diameter, so that when gaps in the container flow suddenly occur, and despite the thereby occurring or possibly brief relaxing of the belt-like element, the length of the latter runs satisfactorily on the peripheral surface of the transport star.

Pursuant to one preferred embodiment of the present invention, the circular cylindrical peripheral surface is embodied in such a way that the radius that determines this peripheral surface is the same or greater than the radius that determines the circular path of the conveying stretch of the transport star. This embodiment has the advantage that the tensioning mechanism provided for tensioning the belt-like element need have only a relatively short tensioning path in order to keep the belt-like element in the tensioned state not only when containers are present in the transport star, but also when containers are missing or there are gaps in the flow of containers in the transport star. This advantage is particularly effective when a common belt-like element for several transport stars is provided with a single tensioning mechanism.

The belt-like element is freely rotatably guided about the rollers, i.e. a separate drive mechanism is not provided for the belt-like element. Rather, the latter is moved along by the transport star as a result of resting against the containers or against the peripheral surface of the transport star. In this way there always results a synchronous movement of the belt-like element with the transport star. In particular, a relative movement between the belt-like element and the containers is avoided, so that as a result of being held securely in place in the transport star, the containers are not only moved free of vibration, but are also transported free of inherent movement, i.e. without rotational movement about their vertical axes, due to the lack of a relative movement between the containers and the belt-like element. Furthermore, due to the fact that the containers are held securely in place, the inventive preliminary stage operates quietly. It should be understood, however, that it would also be possible to drive the belt-like element with the machine.

Pursuant to another preferred embodiment of the present invention, a respective roller, preferably as a guide roller, is provided not only in the region of the inlet of the transport star but also in the outlet thereof. The axes of rotation of these rollers are radially spaced from the axis of rotation of the transport star in such a way that at the inlet and at the outlet of the transport star the respective partial lengths of the belt-like element that rest against the rollers at these locations and that face the transport star have a radial distance from the axis of rotation of the transport star that assures that the containers, and in particular also the containers with the greatest diameter for processing, can be introduced without disruption into the recesses at the inlet of the transport star and can be removed without disruption from these recesses at the outlet of the transport star. An adjustment of these rollers provided at the inlet and outlet of the transport star to the various container sizes is then not required.

To achieve a reliable restraining of containers, and in particular containers of various diameters, in the at least one transport star, the partially circular conveying stretch of the latter is encircled by a free length of the at least one belt-like element, i.e. along this circular length the belt-like element is not guided over rollers.

In another preferred embodiment of the present invention, the free length of the at least one belt-like element that forms the restraining element encircles the pertaining transport star over an angular region of greater than 90°, and preferably over an angular region of 180°, in other words, preferably over an angular region that is also somewhat greater than the partially circular conveying stretch of the transport star, so that independent of their respective diameters, the containers are securely restrained on the conveying stretch of the transport star via the length of the belt-like element.

Further specific features of the present invention will be described in detail subsequently.

DESCRIPTION OF PREFERRED EMBODIMENTS

Referring now to the drawings in detail, as can be seen from FIG. 1, in a bottle processing machine that is otherwise not shown in detail, and includes a filling station and a closure station, the preliminary stage includes an inlet region 1 to which the bottles 2 are supplied via a transport mechanism, such as a conveyor belt 3, in the direction of the arrow A, in other words, in the illustration of FIG. 1, from the left side of the preliminary stage and hence of the bottle processing machine. The preliminary stage also includes an outlet region 4 to which the closed bottles 2 after the processing (for example filling) are transferred from the preliminary stage to a transport mechanism, such as a conveyor belt, for withdrawing the bottles 2 in the direction of the arrow B.

At the inlet region 1, where the upright bottles 2 that follow one another in the conveying direction A are properly spaced by means of a screw mechanism that is provided at the side of the conveyor belt 3, there is provided, as an inlet star, a transport star 7 that is rotatably mounted about a vertical shaft 6, and that is rotatably driven about this shaft 6. The bottles 2 that are delivered by the conveyor belt 3 are supplied one after the other via the screw mechanism 5. The transport star 7 carries the bottles 2 along in its recesses along a partial circle of approximately 180°, with this partial circle being disposed concentric to the shaft 6. At the end of this circular transport stretch, the transport star 7 transfers the bottles 2 to the schematically illustrated rotor of the filling station 8, which rotor is provided with the processing components. In particular, the transport star 7 transfers the bottles 2 to the bottle inlet region 9 of this processing station 8 or the rotor thereof. For this purpose, the transport star 7 rotates about the shaft 6 in the direction of the arrow C, i.e., in the illustrated embodiment in a counterclockwise direction. The rotor of the filling station 8 also rotates about a vertical shaft in the direction of the arrow D, i.e., in the illustrated embodiment in a clockwise direction.

After processing, the upright and still open bottles 2 are transferred at the bottle outlet region 10 of the filling station 8 or the rotor to a further transport star 11. This transport star 11 has the function of a transfer star, and is also rotatably mounted about a vertical shaft 12 about which it is rotatably driven in the direction of the arrow E, i.e., in the illustrated embodiment in a counterclockwise direction. The upright bottles 2 are carried along by the transport star 11 along a partial circle, over an angular range of greater than 180°, that is concentric to the shaft 12. In the illustrated embodiment, the bottles 2 are successively transferred to the inlet 13 of a closure station 14, which follows the transport star 11, or to the rotor thereof that is provided with the closure elements. The rotor of the closure station 14 is rotatably mounted about a similarly vertical shaft 16, and is rotatably driven about this shaft in the direction of the arrow F, i.e., in the illustrated embodiment in a clockwise direction. At the outlet 17 of the closure station 14 the upright and now closed bottles 2 are successively transferred to a further transport star 18. This transport star 18 has the function of an outlet star, and is rotatably mounted about the vertical shaft 19 about which it is rotatably driven in the direction of the arrow G, i.e., in the illustrated embodiment in a counterclockwise direction. The bottles 2 are carried along by the transport star 18 along a partial circle that is concentric to the shaft 19 and, in the illustrated embodiment, extends over an angular range of approximately 180°. For withdrawal, the bottles 2 are subsequently transferred at the outlet region 4 of the bottle processing machine to the transport mechanism provided at that location.

Figure 5:
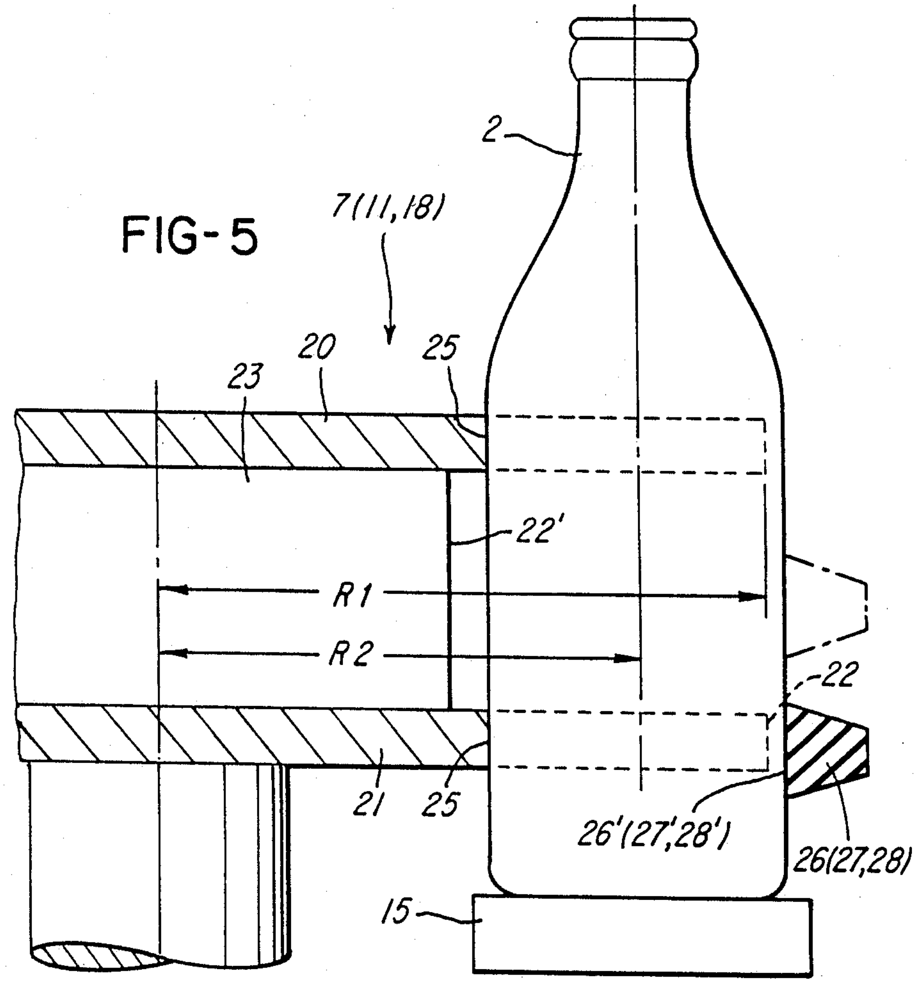
FIG. 5 is a fragmentary, cross-sectional view through one of the transport stars of the preliminary stage of FIG. 1 together with a bottle that is held or clamped in a recess of this transport star, with the vertical sectional plane being taken along the line V—V in FIG. 1.

All of the transport stars 7, 11, and 18 are synchronously driven with the rotors of the filling station 8 and the closure station 14. Despite their possibly different diameters, at least the transport stars 7, 11, and 18 in principle have the same basic construction. In other words, as shown in FIG. 5, each transport star 7, 11, and 18 is comprised, for example, of at least two circular disk-shaped elements 20 and 21, each of which has the same outer diameter. These elements 20, 21 are superimposed parallel to and at such a distance from one another that their upper surfaces are parallel to one another, and the central axes of these elements 20, 21 coincide not only with one another but also with the respective shafts 6, 12, or 19. In order to keep the elements 20 and 21 properly spaced from one another, there is disposed between them a hub-like element 23 that is provided with a round, peripheral surface 22'.

This peripheral surface is also concentric to the shafts 6, 12, or 19 of the pertaining transport star, and the end faces of the element 23 are secured to the elements 20 and 21. The hub-like element 23 has a smaller diameter than do the elements 20 and 21, so that a respective annular region of the latter, each of which is provided with a round peripheral surface 22, projects radially beyond the peripheral surface 22'. In this annular region, respective recesses 25 are formed in the elements 20 and 21. These recesses 25 are open toward the periphery, i.e. at the peripheral surface 22. In a conventional manner, these recesses 25 are distributed with uniform angular spacing about the periphery of the elements 20 and 21 in such a way that each recess 25 in the upper element 20 is in vertical alignment with a recess 25 in the lower element 21. Thus, a respective recess 25 in the element 20 forms with a recess 25 in the element 21 a pocket or space for receiving a bottle 2, with this space being open toward the periphery of the pertaining transport star 7, 11, or 18. The individual transport stars 7, 11, and 18 are each provided with a plurality of such recesses 25, which are provided at a uniform angular spacing about the periphery of the pertaining transport star. Furthermore, it is also possible for the transport stars 7, 11, and 18 to have a configuration different than that described. The important thing is that each transport star, in the region between the upper and lower recesses 25, or on its peripheral surface that is provided with the recesses between the upper and lower sides of the transport star, has a peripheral region that is circular cylindrical in conformity to the peripheral surfaces 22' or 22, and that extends concentric to the axis of rotation of the transport star.

In the embodiment illustrated in FIG. 1, in order to hold the bottles 2, a portion of the peripheral surface of each of which is disposed in the recesses 25 of the transport stars 7, 11, or 18, in these transport stars, a plurality of continuous and endless elements in the form of V-belts 26, 27, and 28 are provided. The V-belt 26 is associated with the transport star 7, the V-belt 27 is associated with the transport star 11, and the V-belt 28 is associated with the transport star 18. Each of these V-belts 26, 27, and 28, which replace the guide curves or guide areas that are conventional for transport stars, are guided by a plurality of rollers 29 that are embodied as V-belt pulleys, as well as by a tensioning roller 31 that is similarly embodied as a V-belt pulley and is provided on a tensioning mechanism 30, in such a way that each continuous loop formed by a V-belt 26, 27, or 28 is disposed in a horizontal plane that is preferably disposed at the level of the peripheral surface 22 of the lower element 21, or at a level approximately in the middle between the elements 20 and 21 of the pertaining transport star 7, 11, or 18. In the illustrated embodiment, all of the loops formed by the V-belts 26, 27, and 28 are disposed in a common horizontal plane, and in particular in a plane that is disposed at the level of the lower element 21, i.e. the peripheral surface 22. Furthermore, the V-belts 26, 27, and 28 are guided over the rollers 29 in such a way that the length 26' of the V-belt 26 encircles the conveying region of the transport star 7, the length 27' of the V-belt 27 encircles the conveying region of the transport star 11, and the length 28' of the V-belt 28 encircles the conveying region of the transport star 18. The V-belts 26 and 28 each have three rollers 29 that serve for guidance and a tensioning mechanism 30 with a tensioning roller 31, and the V-belt 27 has four rollers 29 and a tensioning mechanism 30 with a tensioning roller 31. The specific arrangement of these rollers is such that a respective guide roller 29 is provided at the inlet and outlet of each transport star 7, 11, and 18. In other words, at these locations the pertaining V-belts 26, 27, and 28 are deflected by 180°. The distance between that respective peripheral region of the pertaining guide roller 29 that faces the peripheral surface of the transport star 7, 11, or 18 at the inlet or outlet of each such transport star and the closed side or base of the recesses 25 that face the axis of rotation of such transport star, is greater than the maximum diameter of the bottles 2 that are to be handled or processed by the bottle processing machine. The further roller or rollers 29, and the tensioning roller 31, are spaced an even greater radial distance from the pertaining transport star, so that without having to undertake an adjustment of the belt-like retaining elements of the preliminary stage, and especially without having to adjust the rollers 29, bottles 2 with different size diameters can be processed.

In the embodiment illustrated with solid lines in FIG. 5, the bottles 2 are held against the transport stars 7, 11, or 18 by those lengths 26', 27', or 28' of the respective belt-like element that is disposed opposite the peripheral surface 22 of the lower element 21, and hence at a slight distance above the fixed sliding surface 15 on which the bottoms of the bottles 2 slide. This considerably improves the securing and hence also the desirable quiet transport of the bottles 2.

In the illustrated embodiment, additional guides 24 are provided at the inlet 13 after the length 27' when seen in the direction of transport, as well as at the outlet 17 ahead of the length 28' when viewed in the direction of transport.

Figure 4:
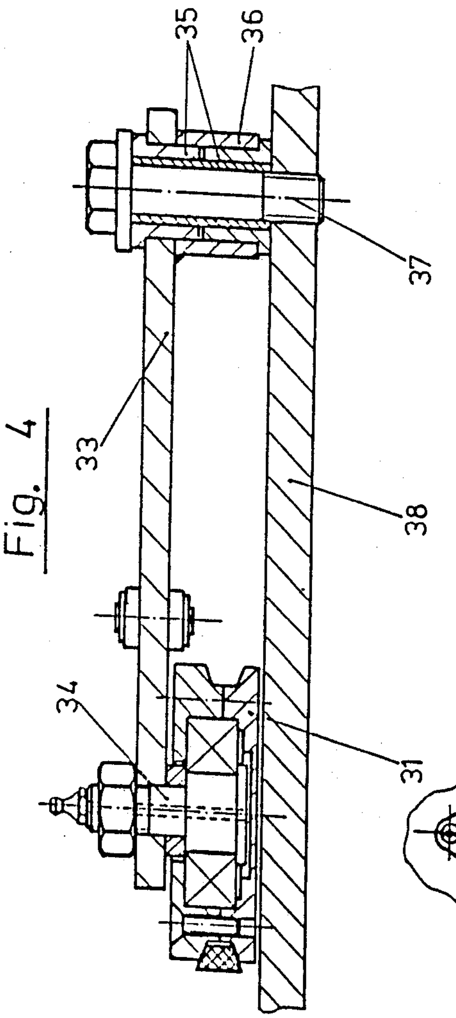
FIG. 4 is an enlarged cross-sectional view taken along the line IV—IV in FIG. 3.
Figure 2:
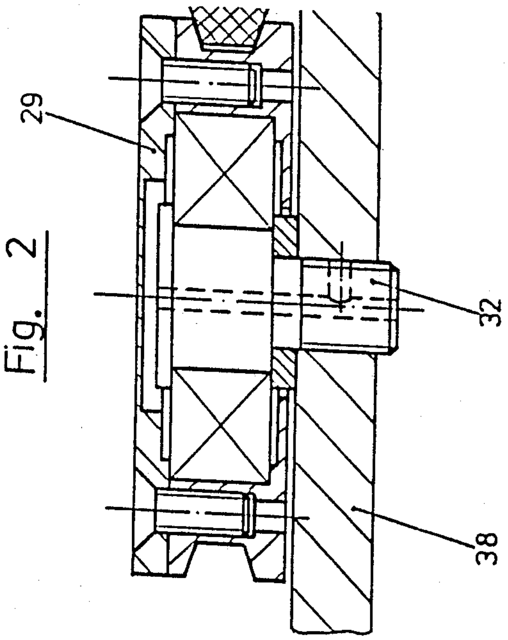
FIG. 2 is a detailed cross-sectional view of one of the rollers that are used with the preliminary stage of FIG. 1, that serve as deflection or guide rollers, and that are embodied as V-belt pulleys.
Figure 3:
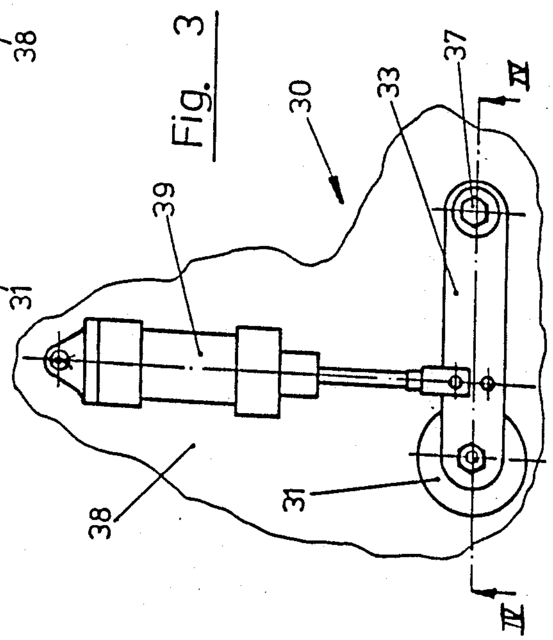
FIG. 3 is a detailed plan view of one of the tensioning mechanisms of the preliminary stage of FIG. 1.

As shown in FIG. 2, each roller 29 is freely rotatably mounted about a vertical axis on a journal pin 32. As shown in particular in FIGS. 3 and 4, each tensioning mechanism 30 comprises a lever arm 33, the free end of which carries the tensioning roller 31, which at that location is freely rotatably mounted about a vertical axis with the aid of a journal pin 34. The other end of the lever arm 33 is provided with a bearing sleeve 36 that accommodates a pivot bearing 35 via which the lever arm 33 can be pivoted about a vertical axis on a bearing pin 37. The bearing pins 37 of the tensioning mechanisms 30, as well as the journal pins 32 of the rollers 29, are provided on the upper side of support plates 38 that are secured via non-illustrated conventional support bolts on the upper side of the preliminary stage or the machine housing, or rest directly on the latter. This can be accomplished, for example, by using the retaining means that are already provided at this location for the conventional guide areas. In the embodiment illustrated in FIG. 1, two such support plates 38 are provided. One support plate is provided for the rollers 29 and tensioning mechanism 30 of the V-belt 26 as well for the three rollers 29 of the V-belt 27 shown to the left of the shaft 12 in FIG. 1, and a support plate 38 for the rollers 29 and the tensioning mechanism 30 of the V-belt 28 as well as for the tensioning mechanism 30 and remaining roller 29 of the V-belt 27.

By using support plates 38, the latter, along with the rollers 29 and the tensioning mechanisms 30, and possiblY also with the V-belts 26 and 28, can be preassembled and secured to the preliminary stage in this condition, so that the assembly of the guide and retaining mechanism formed by the V-belts 26, 27, and 28 is very straightforward and can even make it possible without difficulty to retrofit existing bottle processing machines with the inventive mechanism.

Each tensioning mechanism 30 is also provided with a spring element 39, one end of which is hinged to the lever arm 33 between the two ends thereof, and the other end of which is hinged to the pertaining support plate 38. In the illustrated embodiment, each spring element 39 is formed by a pneumatic cylinder. In addition to the spring effect, this also provides the possibility for a preadjustment as a function of the size or diameter of the bottles that are to be processed. Via the tensioning mechanisms 30, the V-belts 26, 27, and 28 are tensioned in such a way that the lengths 26', 27', or 28' thereof rest against the bottles 2 that are received in the recesses 25 of the transport stars 7, 11, or 18. In particular, these V-belt lengths rest against that region of the peripheral sides of the bottles 2 that are remote from the respective shafts 6, 12, or 19, so that the bottles 2 are held securely in the recesses 25. This function of the V-belts 26, 27, and 28 is independent of the diameter of the bottles 2 that are being processed at any given time, so that without having to first manually adjust the preliminary stage, bottles 2 of various sizes or diameters can be processed. Should a gap exist in the flow of bottles, i.e. should bottles be missing in a transport star 7, 11, or 18, the length 26', 27', or 28' of the pertaining V-belt rests against the peripheral surface 22 of the lower element 21, or, if the embodiment indicated by dot-dash lines in FIG. 5 exist, against the peripheral surface 22' of the hub-like element 23, so that even when gaps are present in the flow of bottles a satisfactory guidance of the pertaining V-belt 26, 27, or 28 about the pertaining transport star 7, 11, or 18 and the rollers 29 as well as the pertaining tensioning roller 31 is assured. Since all of the rollers 29, as well as the tensioning rollers 31, are freely rotatably mounted, the V-belts 26, 27, and 28 are moved exclusively by the transport stars 7, 11, and 18 (by resting against the bottles 2 or the peripheral surfaces of the elements 20, 21 or 23). Since therefore no relative movement exists between the bottles 2 and the outer retaining elements formed by the lengths 26', 27', or 28', a very quiet transport of the bottles 2 is achieved in the transport stars 7, 11, and 18 without vibrating or turning the bottles. The latter is particularly important during the transfer of filled bottles 2 from the rotor of the filling station 8 to the rotor of the closure station 14. Furthermore, the use of the V-belts 26, 27, and 28 provides for a particularly quietly running apparatus.

Figure 6:
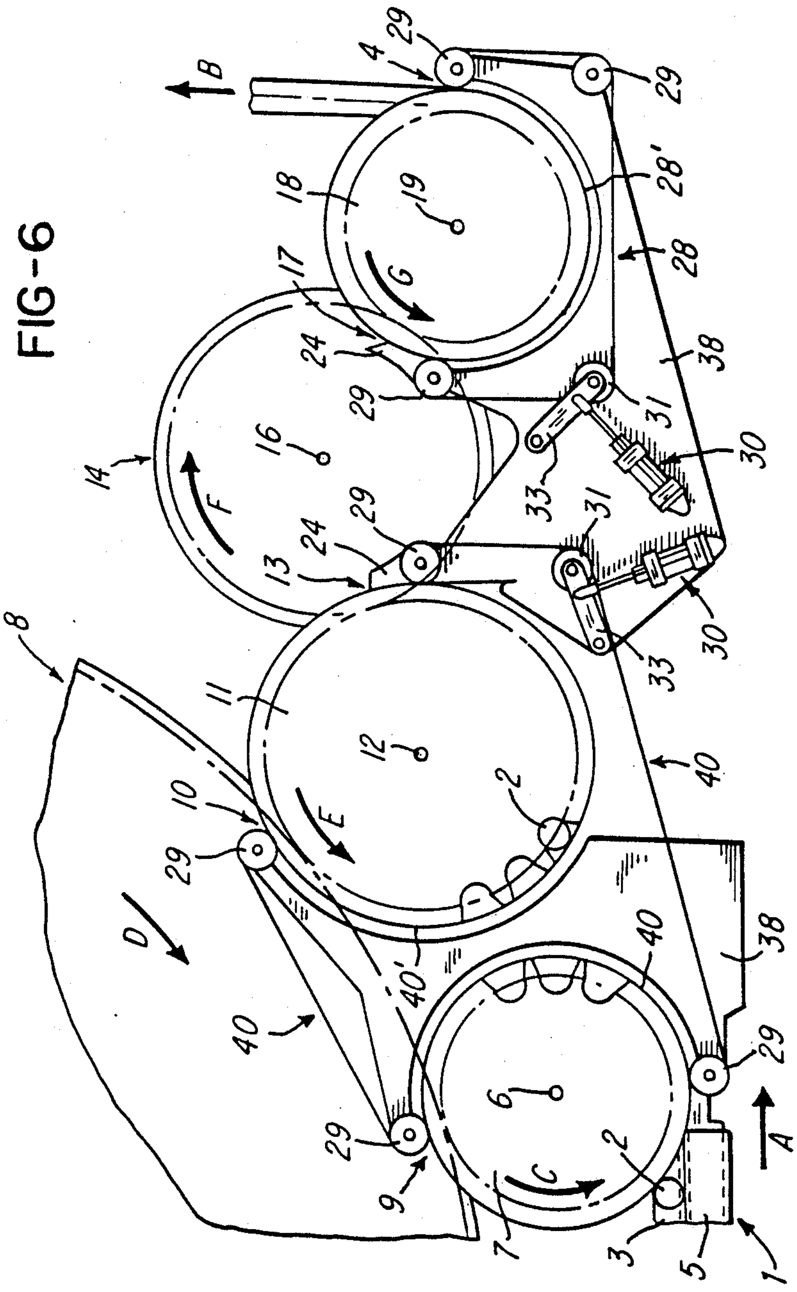
FIGS. 6 & 7 are views that show illustrations similar to that of FIG. 1, but of two further exemplary embodiments of the inventive preliminary stage.

The further embodiment illustrated in FIG. 6 differs from the embodiment of FIG. 1 essentially only in that with this embodiment, instead of separate V-belts 26 and 27 for the transport stars 7 and 11, a common closed loop, in other words a common continuous V-belt 40, is provided. The lengths 40' and 40" of this V-belt 40 encircle the conveying region of the transport star 7 or the conveying region of the transport star 11. In other words, the lengths 40' and 40" have the same function as do the lengths 26' and 27'. By using the common V-belt 40 for the transport stars 7 and 11, it is necessary to provide only a single tensioning mechanism 30 for the two transport stars, with this tensioning mechanism 30 having a larger tensioning path that conforms to its function. In addition, the number of rollers 29 for these two transport stars can be reduced to a total of four, thus resulting in a considerable structural simplification. This embodiment retains the respective guide rollers 29 at the inlet and outlet of the transport stars 7 and 11. However, the guidance of the V-belt 40 is effected in such a way that those lengths of the latter disposed beyond the conveying region of the transport stars 7 and 11 extend linearly between that roller 29 disposed at the outlet of the transport star 7 and that roller 29 disposed at the inlet of the transport star 11, and extends at an angle over the tensioning roller 31 between the roller 29 at the inlet of the transport star 7 and the roller 29 at the outlet of the transport star 11.

Figure 7:
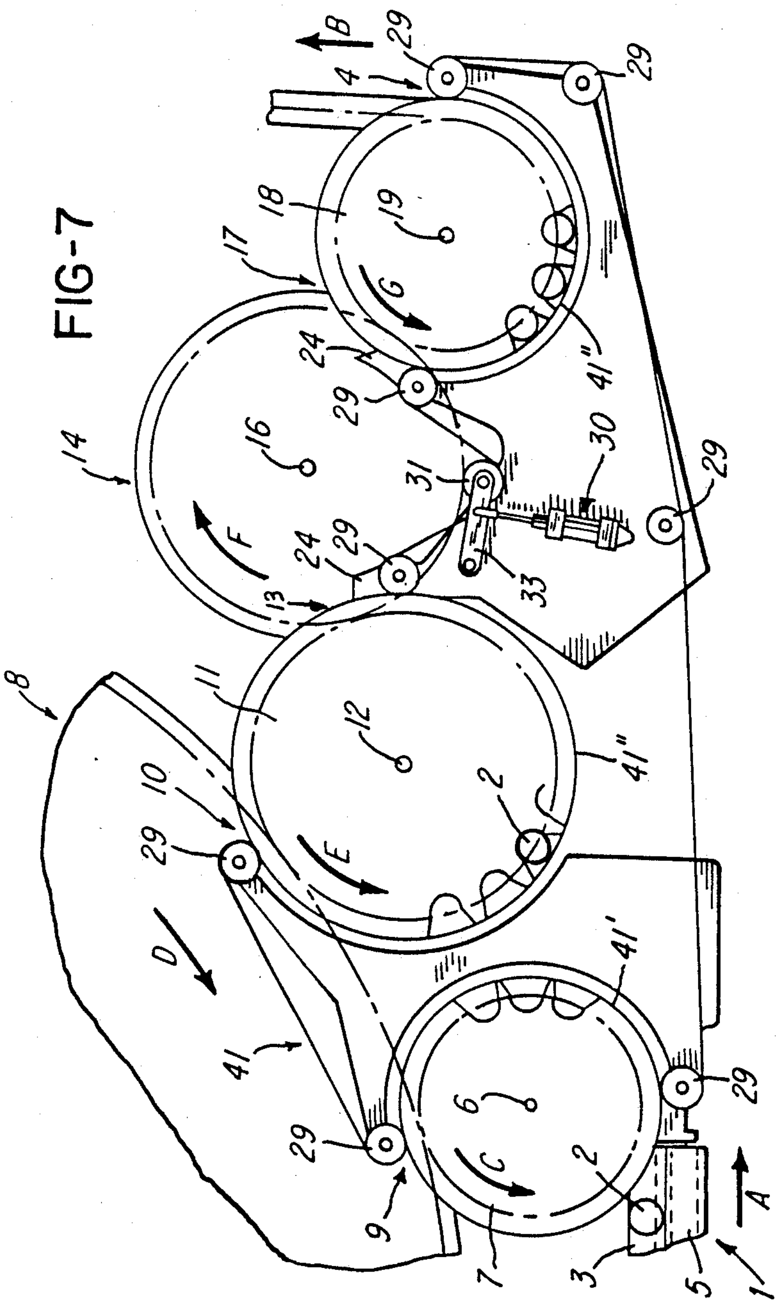

FIG. 7 shows a further embodiment that differs from the embodiment of FIG. 6 in that with this further embodiment a common V-belt 41 is provided for the transport stars 7, 11, and 18, with the lengths 41' and 41" encircling not only the conveying regions of the transport stars 7 and 11 as was the case with the V-belt 40, but also encircling conveying region of the transport star 18 via a length 41'''. Using the single V-belt 41 results in a further structural simplification since now it is necessary to have only a single tensioning mechanism 30 with an appropriate tensioning path or stroke. In contrast to the embodiment illustrated in FIG. 1, with the embodiment of FIG. 7 the number of rollers 29 is reduced to eight. Between the inlet of the transport star 7 and the outlet of the transport star 11, the V-belt 41 has the same path as does the V-belt 40. However, the length of the latter that follows the roller 29 provided at the outlet of the transport star 11 is guided over the tensioning roller 31 of the tensioning mechanism 30 to the roller 29 provided at the inlet of the transport star 18, and extends from the roller 29 provided at the outlet of the transport star 18 over to further rollers 29 back to the roller 29 that is provided at the inlet of the transport star 7.

Figure 8:
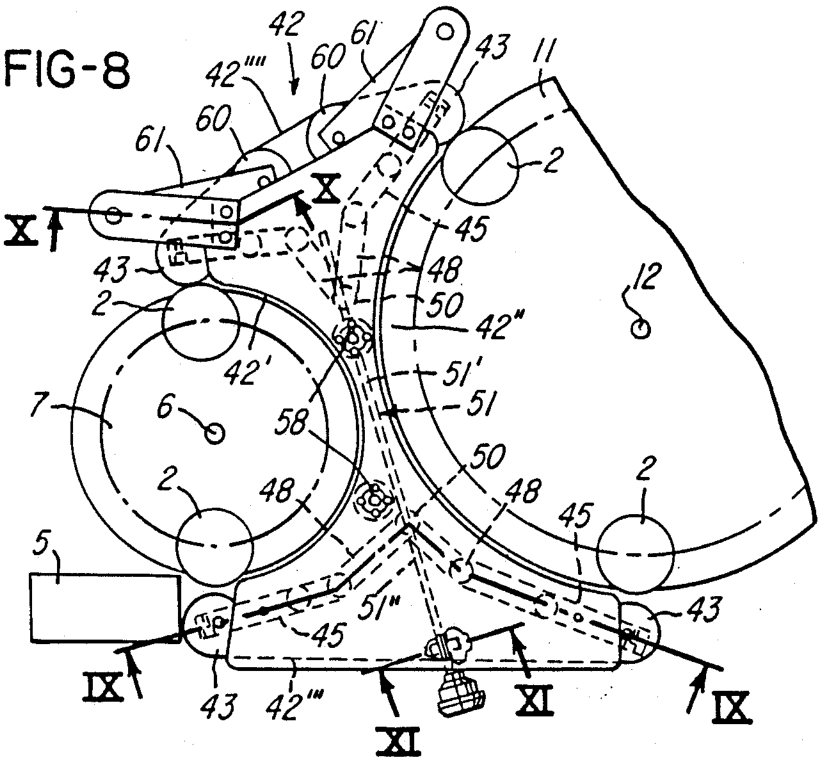
FIG. 8 is a partial plan view similar to that of FIG. 1 of a further exemplary embodiment of the inventive preliminary stage.
Figure 9:
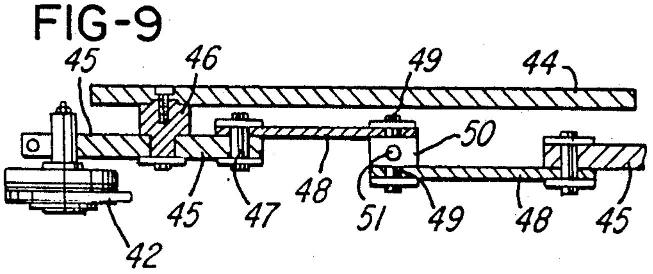
FIG. 9 is a cross-sectional view taken along the line IX—IX in FIG. 8.
Figure 10:
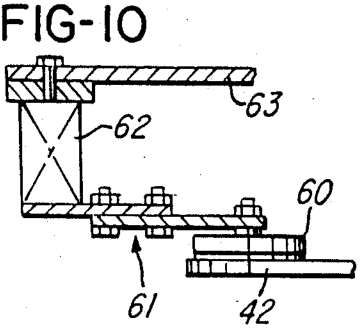
FIG. 10 is a cross-sectional view taken along the line X—X in FIG. 8.
Figure 11:
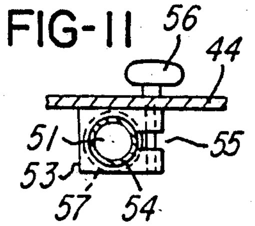
FIG. 11 is a cross-sectional view taken along the line XI—XI in FIG. 8.

A further inventive embodiment is illustrated in FIGS. 8 to 12. To simplify illustration, FIG. 8 shows only the two transport stars 7 and 11 and the associated elements. This embodiment corresponds to the embodiment of FIG. 6 to the extent that a single continuous enclosed belt-like element, namely the V-belt 42, is provided for the two transport stars 7 and 11. The length 42' of the V-belt 42 encircles the conveYing region of the transport star 7, and the length 42" encircles the conveying region of the transport star 11. Respective rollers 43, corresponding to the rollers 29, are again provided at the inlet and outlet of the transport stars 7 and 11. The V-belt 42 is guided over these rollers 43 in such a way that a length 42''' is formed between the roller 43 at the inlet of the transport star 7 and the roller 43 at the outlet of the transport star 11, and a length 42'''' is formed between the roller 43 at the outlet of the transport star 7 and the roller 43 at the inlet of the transport star 11.

In contrast to the rollers 29, the rollers 43 are not securely held on the machine frame of the preliminary stage. Instead, they are adjustably provided on a plate 44 in such a way that the distance between the axis of each roller 43 and the shaft 6 or 12 of the pertaining transport star 7 or 11 can be varied, so that this distance, and hence also the distance of the V-belt 42 at the inlet and outlet of the transport stars 7 and 11 can be adapted to the respective diameter of the bottles 2 that are being processed. In other words, in the embodiment illustrated in FIGS. 8 to 12, for example during exchange of the transport stars 7 and 11, bottles 2 with very different diameters can also be processed. For this adjustment, each roller 43 is rotatably mounted about a vertical axis on one end of a double-armed pivot lever 45 that in turn is pivotably secured with the aid of a bearing element 46 to the underside of the plate 44 between the two ends thereof and also about a vertical axis. The other end of each pivot lever 45 is connected via a pivot pin 47 with one end of an intermediate lever 48 that is also provided beneath the plate 44. In each case two intermediate levers 48, namely the lever 48 in the region of the outlet of the transport star 7 and the lever 48 in the region of the inlet of the transport star 11, or the lever 48 in the region of the inlet of the transport star 7 and the lever 48 in the region of the outlet of a transport star 11, are hinged at their other ends to a common internal threaded member 50 with the aid of a pivot pin 49. The axes of the pivot pins 47 and 49 are disposed parallel to the pivot axis of the pivot lever 45, i.e. are disposed in a vertical direction. The threads of the two internal threaded members 50 engage the external thread of respective threaded sections 51' or 51" of a spindle 51 that is also provided below the plate 44. The axis of the spindle 51 is disposed in the horizontal direction, and one of the lengths of a spindle 51 that has the threaded sections 51' and 51" extends into the region between the two transport stars 7 and 11. In the illustrated embodiment, the two threaded sections 51' and 51" are oriented in opposite directions. In other words, one of the threaded sections has a right hand thread and the other has a left hand thread. Furthermore, the configuration is such that the two intermediate levers 48 that are hinged to a common internal threaded member 50 form an angle with one another that in the direction of the axis of the spindle 51 is open to that side remote from the other internal threaded member 50.

Figure 12:
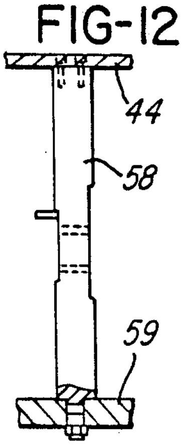
FIG. 12 is a detailed view of one of the bolts used as a spacer for the preliminary stage of FIG. 8.

The spindle 51, which has a non-threaded end that projects beyond a side of the plate 44 that extends parallel to length 42''', where it is provided with a rotary handle 52, is rotatably mounted to the underside of the plate 44, yet cannot be shifted axially. In particular, this mounting is effected on a non-threaded portion adjacent the rotary handle 2 with the aid of a bearing element 53 that is secured to the underside of the plate 44 and which is provided with a bearing hole 54 for the spindle 51. Also provided in the bearing element 53, on one side of the bearing hole 54, is a continuous slot 55 that also opens into the bearing hole. Via this slot 55, the bearing element 53 is simultaneously embodied as a clamping element, so that by tightening a set screw 56 that is provided with a hand grip, the spindle 51 can be secured in the bearing element 53 or can be prevented from rotating about its axis. To prevent axial shifting of the spindle 51, rings or set collars 57 are secured to the spindle 51 on both sides of the bearing element 53. The plate 44 is held at a distance above the upper side of the machine frame 59 by a plurality of bolt-like spacers 58 that extend in the vertical direction (FIG. 12). One of these spacers 58 is disposed in such a wa that it is intersected by the spindle 51, i.e. a bore is provided in the spacer 58 in which the spindle 51, in the vicinity of that end thereof that is remote from the rotary handle 52, is additionally mounted or supported.

As a result of the described configuration of the threaded portions 51' and 51", when the spindle 51 is turned, the internal threaded members 50 are moved toward one another, thus reducing the distance between them, or are moved apart, thus increasing the distance from one another, all depending upon the direction of rotation. In the first case, via the intermediate lever 48, the pivot levers 45 are pivoted in such a way that the radial distance of the rollers 43 from the shafts 6 or 12 is increased, and in the second case the pivot levers 45 are pivoted in such a way that this distance is reduced; this pertains to all of the pivot levers 45. By an appropriate selection of the lengths of the pivot levers 45 and/or the intermediate levers 48, and/or by an appropriate selection of the relative position that these levers have relative to one another, one is assured that when the spindle 51 is turned in one or the other direction, all of the rollers 43 provided on the pivot levers 45 are respectively moved radially relative to the shafts 6 or 12 of the appropriate transport star 7 or 11 of the same or at least nearly the same amount. In this way it is possible to adjust all of the rollers 43 together by rotating the single spindle 51. After each adjustment, the spindle 51 is locked in position with the aid of the set screw 56.

In order to obtain the tension needed for the V-belt 42 at any given time, the length 42'''' of this V-belt is guided over two tensioning rollers 60, the function of which corresponds to that of the tensioning rollers 31. Each tensioning roller 60 is secured to one end of a pivot arm 61, the other end of which is secured to a tensioning element 62 that acts as a torsion spring. Each spring element 62, against the action of its spring force, makes it possible for the pertaining pivot arm 61 to pivot about a vertical axis. Each spring element 62 is held on the plate 44 via a support arm 63.

Although the present invention has been described in connection with specific embodiments, it is to be understood that changes and modifications are also possible without thereby straying from the inventive concept. For example, in place of the V-belts 26, 27, 28, 40, 41, or 42, other belts or belt-like elements could also be used, such as toothed belts or a plurality of V-belts or belt-like elements that are superimposed in the vertical direction, for example at the level of each element 20 and 21.

In principle, all of the inventive embodiments have the advantage that due to their very effective restraining of the bottles 2 on the transport stars 7, 11, and 18 via the V-belts 26, 27, 28, 40, 41, and 42 as well as via other belts or belt-like elements, it would be possible to entirely dispense with the sliding surfaces 15 for such transport stars 7, 11, or 18.

The present invention is, of course, in no way restricted to the specific disclosure of the specification and drawings, but also encompasses any modifications within the scope of the appended claims.

What I claim is :

1. In a preliminary stage of a container processing machine that has a machine frame, with a container inlet for containers that are to be processed, a container outlet for processed containers, and transport elements for effecting the flow of containers between said inlet and outlet, with at least one of said transport elements comprising a transport star, which rotates about a vertical axis, and a restraining element, with said transport star having a peripheral surface that concentrically encircles the axis of rotation of the transport star and that is provided with a plurality of uniformly spaced recesses that are radially open in the direction of said peripheral surface and serve to transport said containers along a circular path from an inlet of that transport star to an outlet thereof, and with said restraining element being disposed to the side of said circular transport path opposite said peripheral surface, the improvement wherein:

said restraining element is formed from at least one free length of at least one belt-like element that is disposed externally of said transport star, forms a closed loop, and is endlessly guided, in a tensioned state, over rollers that are provided on said machine frame, with each free length being disposed radially remote from the axis of rotation of said peripheral surface of said transport star;

said peripheral surface is embodied in such a way that said free length rests thereagainst at least when said transport star is not filled with containers;

at least one support plate is disposed on an upper side of said machine frame, with at least several of said rollers of a given belt-like element being mounted on a given one of said support plates;

several transport stars are provided, with said rollers of a belt-like element of at least one of said transport stars being disposed on different support plates; and two support plates are provided, on one of which are mounted all of said rollers of a belt-like element for a first one of said transport stars plus some of said rollers for a belt-like element of a second one of said transport stars, and on the other of which are mounted all of said rollers of a belt-like element for a third one of said transport stars plus the rest of said rollers for said belt-like element of said second transport star.

2. A preliminary stage according to claim 1, in which each belt-like element, along with said loop formed thereby, is disposed in a horizontal plane that extends perpendicular to the axis of rotation of said transport star.

3. A preliminary stage according to claim 1, in which each belt-like element is freely rotatably guided over said rollers.

4. A preliminary stage according to claim 1, which includes at least one tensioning mechanism for effecting said tensioned state of each belt-like element, with each tensioning mechanism having a tensioning roller formed by one of said rollers.

5. A preliminary stage according to claim 4, in which said tensioning mechanism is mounted on said machine frame in such a way that its tensioning roller is adjustable in a direction transverse to the axis of rotation of the tensioning roller.

6. A preliminary stage according to claim 5, in which said tensioning mechanism includes a lever arm having two ends, on one of which said tensioning roller is rotatably mounted, and the other of which is pivotably mounted on said machine frame.

7. A preliminary stage according to claim 6, in which said tensioning mechanism is provided with a spring element.

8. A preliminary stage according to claim 7, in which said spring element is a torsion spring.

9. A preliminary stage according to claim 7, in which said spring element is a pneumatic cylinder.

10. A preliminary stage according to claim 1, in which each belt-like element is made of a material that permits elastic elongation thereof.

11. A preliminary stage according to claim 1, in which a respective one of said rollers is disposed in said inlet region of said transport star as well as in said outlet region thereof, with the axes of rotation of these rollers being spaced radially from the axis of rotation of said transport star by such a distance that at said inlet and outlet of said transport star, the respective portions of said lengths of said belt-like element that rest against the adjacent one of said rollers, and that face said transport star, are radially spaced from the axis of rotation of said transport star by a distance that ensures that containers can be introduced into said recesses without disturbance at said inlet of said transport star, and can be withdrawn from said recesses without disturbance at said outlet of said transport star.

12. A preliminary stage according to claim 1, which includes at least two transport elements that are embodied as transport stars, each of which is provided with a separate belt-like element.

13. A preliminary stage according to claim 1, which includes three transport elements that are embodied as transport stars, with the first transport star forming a container inlet of a first processing station, the second transport star forming a transfer star at the outlet of said first processing station and at the inlet of a second processing station, and the third transport star forming the container outlet of said second processing station, with a separate belt-like element being provided for each of said transport stars.

14. A preliminary stage according to claim 1, in which each belt-like element is a V-belt, and said rollers are V-belt pulleys.

15. A preliminary stage according to claim 1, in which said peripheral surface of said transport star is embodied in such a way that the radius which determines said peripheral surface is equal to or greater than the radius that determines a circular path for a conveying stretch for said transport star.

16. A preliminary stage according to claim 15, in which said radius that determines said peripheral surface is greater than said radius that determines said circular path of said conveying stretch of said transport star by an amount equal to one half of the diameter of one of said containers minus about 5 mm.

17. A preliminary stage according to claim 1, in which, to support said free length, said peripheral surface includes a further peripheral surface that is free of said recesses and has a radius which determines the outer periphery thereof and is equal to or less than the radius that determines a circular path for a conveying stretch for said transport star.

18. A preliminary stage according to claim 1, in which said free length of said belt-like element encircles said transport star over an angular region of greater than 90°.

19. A preliminary stage according to claim 18, in which said free length of said belt-like element encircles said transport star over an angular region of at least 180°.

* * * * *